US008788479B2

(12) United States Patent
Manuel-Devadoss et al.

(10) Patent No.: US 8,788,479 B2
(45) Date of Patent: Jul. 22, 2014

(54) METHOD AND SYSTEM TO UPDATE USER ACTIVITIES FROM THE WORLD WIDE WEB TO SUBSCRIBED SOCIAL MEDIA WEB SITES AFTER APPROVAL

(71) Applicants: Johnson Manuel-Devadoss, Pearland, TX (US); Christy Aarthi Jones, Pearland, TX (US)

(72) Inventors: Johnson Manuel-Devadoss, Pearland, TX (US); Christy Aarthi Jones, Pearland, TX (US)

(73) Assignees: Johnson Manuel-Devadoss, Pearland, TX (US); Christy Aarthi Jones, Pearland, TX (US)

( * ) Notice: Subject to any disclaimer, the term of this patent is extended or adjusted under 35 U.S.C. 154(b) by 84 days.

(21) Appl. No.: 13/726,695

(22) Filed: Dec. 26, 2012

(65) Prior Publication Data

US 2013/0117254 A1    May 9, 2013

(51) Int. Cl.
*G06F 17/30* (2006.01)

(52) U.S. Cl.
CPC .... *G06F 17/30864* (2013.01); *G06F 17/30867* (2013.01)
USPC ........... 707/710; 707/706; 707/736; 707/758; 706/12; 706/14

(58) Field of Classification Search
None
See application file for complete search history.

(56) References Cited

U.S. PATENT DOCUMENTS

| | | | | |
|---|---|---|---|---|
| 7,734,641 | B2* | 6/2010 | Kanigsberg et al. | 707/765 |
| 8,156,064 | B2* | 4/2012 | Brown | 706/46 |
| 8,290,999 | B2* | 10/2012 | Shepherd et al. | 707/728 |
| 8,473,440 | B2* | 6/2013 | Brown | 706/45 |
| 8,533,269 | B2* | 9/2013 | Brown | 709/205 |
| 8,572,191 | B2* | 10/2013 | Bonforte | 709/206 |
| 2011/0047182 | A1* | 2/2011 | Shepherd et al. | 707/780 |
| 2012/0066073 | A1* | 3/2012 | Dilip et al. | 705/14.66 |
| 2012/0136905 | A1* | 5/2012 | Pullara | 707/803 |
| 2012/0203846 | A1* | 8/2012 | Hull et al. | 709/206 |
| 2012/0239683 | A1* | 9/2012 | Starkman | 707/769 |
| 2012/0290407 | A1* | 11/2012 | Hubbard et al. | 705/14.72 |
| 2012/0296920 | A1* | 11/2012 | Sahni et al. | 707/749 |
| 2013/0073400 | A1* | 3/2013 | Heath | 705/14.73 |
| 2013/0110641 | A1* | 5/2013 | Ormont et al. | 705/14.66 |
| 2013/0246595 | A1* | 9/2013 | O'Donoghue et al. | 709/223 |
| 2013/0246926 | A1* | 9/2013 | Vemireddy | 715/738 |
| 2014/0046776 | A1* | 2/2014 | Kanigsberg et al. | 705/14.66 |
| 2014/0052804 | A1* | 2/2014 | Bonforte | 709/206 |
| 2014/0095433 | A1* | 4/2014 | Cort et al. | 707/610 |
| 2014/0101123 | A1* | 4/2014 | Ganesh | 707/706 |
| 2014/0101231 | A1* | 4/2014 | Doshi et al. | 709/203 |

* cited by examiner

Primary Examiner — Hung Le

(57) ABSTRACT

Disclosed is a system and method to search the World Wide Web for latest user activities and information and update the user activities and information to user subscribed social media websites with user's approval. User subscribes their personal information and interests to the present invention. Present invention crawls and formats the information available in the World Wide Web for the provided user information and interests. The formatted information is notified to the user for approval. The user reviews the information, accepts or rejects the information. The user can edit the information to change the content. The approved information is updated to user subscribed social media websites.

13 Claims, 4 Drawing Sheets

METHOD AND SYSTEM TO UPDATE USER ACTIVITIES FROM THE WORLD WIDE WEB TO SUBSCRIBED SOCIAL MEDIA WEB SITES AFTER APPROVAL

BACKGROUND OF THE INVENTION

1. Field of the Invention

The present invention relates to updating the user activities and their related interests that are available in the World Wide Web to the user subscribed social media websites after user approves the content.

2. Description of Related Art

In this busy world user does not have time to update their information to the social media websites, however they like to keep their friends informed about the activities or changes in their day to day life.

Similarly, news related to user interests may be available in the World Wide Web but because of busy work schedules users may not be able to browse and find these interests related updates individually.

The present invention is also useful for users who are new to social media websites. Users may be novice and may not know how to update their user activities or user related interests in their social media websites.

SUMMARY OF THE INVENTION

Users subscribe to the present invention. During subscription process the present invention collects key information that helps to identify a user uniquely like name, location, sex, date of birth, work and education history along with their interests like sports they are interested, hobbies and other personal interests like art, music, books, financial interests etc. The user can provide as many information as they desire or limit only to a few of the information. These information and interests help to identify the user when retrieving user activities in the World Wide Web. The present invention stores the information and interests.

A web crawler crawls the World Wide Web for new content based on the provided URLs. The crawled content is indexed and queried for any new activities about the user or user related interests. Notification messages are formed based on the search query results and coupled with Approve and Reject options. The notification messages are sent to user for review. The user looks at the activities collected and approves or rejects the notification messages based on what he wishes to share. The user can also edit the notification messages and change context of the message. The approved notification messages updates to different social media websites the user has subscribed to like Facebook, LinkedIn, Twitter, etc.

The object of the present invention is to provide an automated system to update the user activities and user activities to their subscribed social media websites based on the user approval.

Another object of the present invention is to retrieve the latest information about the user and user interests from the World Wide Web and to notify the user activities found about the user for their approval prior to updating them in user preferred social media websites.

Still another object of the present invention is to allow user to modify the content of notification message prior to approving the notification message.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of implementations consistent with the principles of the invention along with accompanying drawings indicated above. The same reference numbers in different drawings may identify the same or similar elements. In addition, the following detailed description does not limit the invention.

Implementation consistent with the principles of the invention is directed to updating the user activities that is available in the World Wide Web to their preferred social media websites once the user approves the content.

For example, implementations described herein may leverage information available on the World Wide Web about the user like his career changes, moving to a new city and their interests updates like their favorite team winning, are collected periodically and hosted to all their preferred social media websites after the user has had a chance to review or edit the notification message content.

Figure 1:
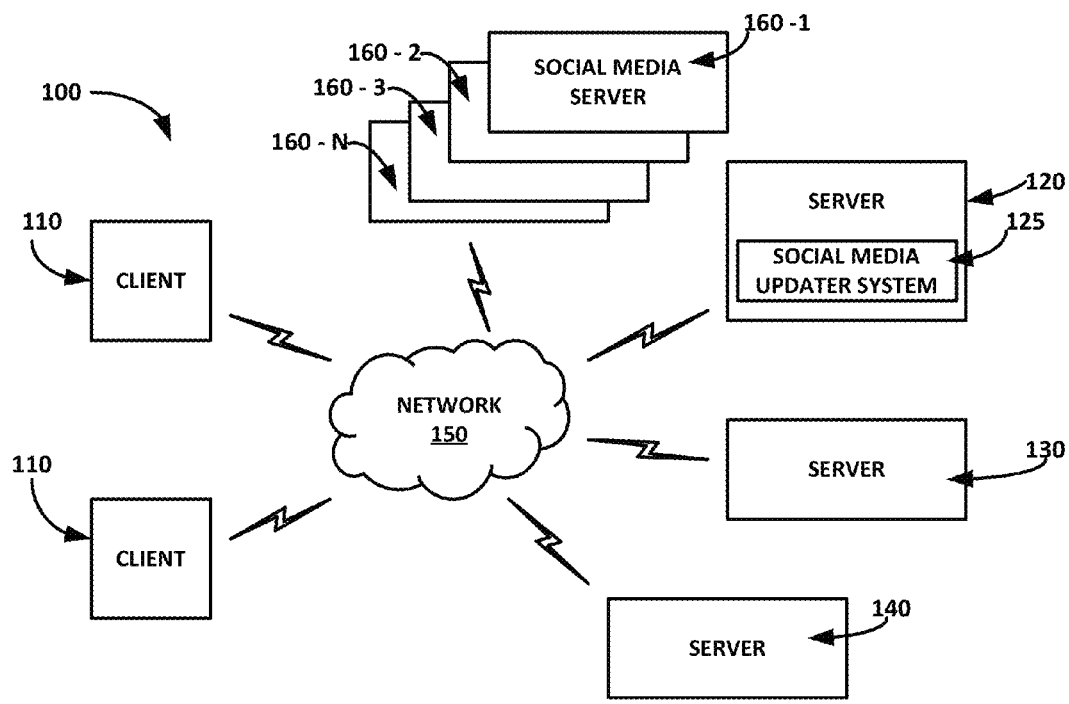
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to server 120, social media servers 160-1, 160-2, . . . , 160-N (collectively referred to as "social media servers 160") via a network 150. Two clients 110, a single server 120, N servers 160 have been illustrated as connected to network 150 for simplicity. In practice, there may be more or fewer clients and servers. Also, in some instances, a client may perform a function of a server and a server may perform a function of a client.

Clients 110 may include client entities. An entity may be defined as a device, such as a personal computer, a wireless telephone, a personal digital assistant (PDA), a laptop, or another type of computation or communication device, a thread or process running on one of these devices, and/or an object executable by one of these devices. Servers 120, 160 may include server entities that gather, process, search, and/or maintain web pages in a manner consistent with the principles of the invention.

In an implementation consistent with the principles of the invention, server 120 may include a social media updater system 125 to update the user activities that are available in the World Wide Web to their preferred social media servers 160 after user's approval. Server 120 gathers user activities based on user personal information and interests from the World Wide Web and updates it to social media servers 160. The social media servers 160 may be any combination of software agents and/or hardware modules for establishing a social media-based platform for users. The social media servers 160 may facilitate interaction and communication among users of the client devices 110 via the network 150. For example, the social media servers 160 may provide a platform for users of the client devices 110 who are members of the social network to upload photos and notes to share with other users of client devices 110 who are also members of the same social network. In one embodiment, the social network server 1160 may facilitate sharing of information about news and activities of members of the social network with other members designated as friends within the social network. The functionality of the social media-based platform may also be distributed across multiple servers disposed across the network 150.

Network 150 may include a local area network (LAN), a wide area network (WAN), a telephone network, such as the Public Switched Telephone Network (PSTN), an intranet, the Internet, a memory device, or a combination of networks. Clients 110 and servers 120, 160 may connect to network 150 via wired, wireless, and/or optical connections.

Figure 2:
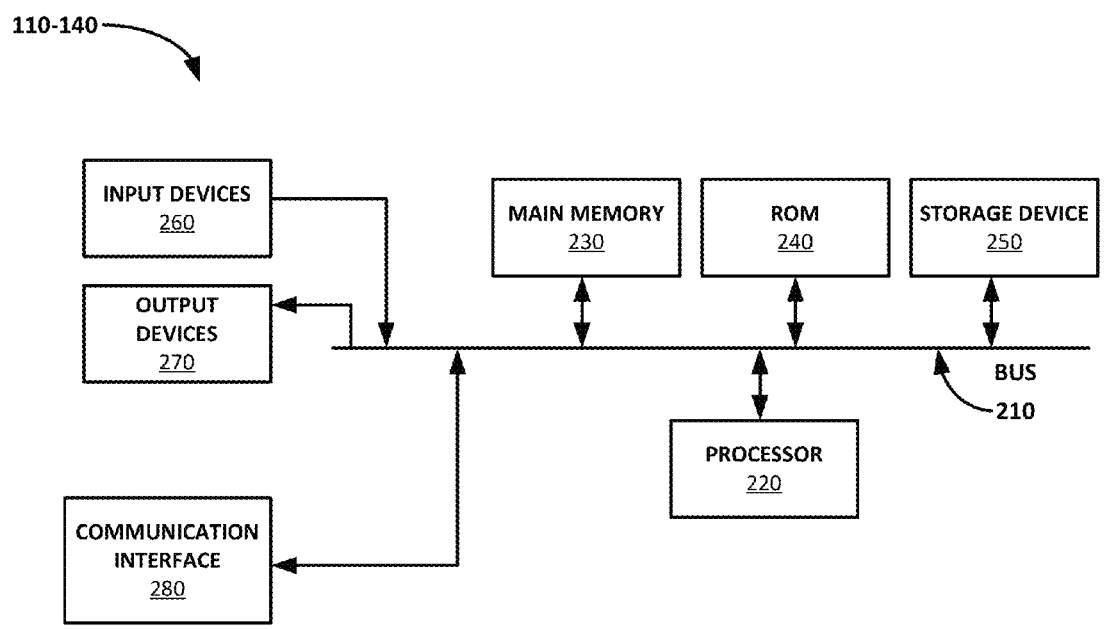
FIG. 2 is an exemplary diagram of a client and/or server of FIG. 1 according to an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include one or more conventional processors or microprocessors that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As it will be described in detail below, the client/server entity, consistent with the principles of the invention, perform certain searching, generating user notification with their activities, updating the user activities to their subscribed social media websites related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
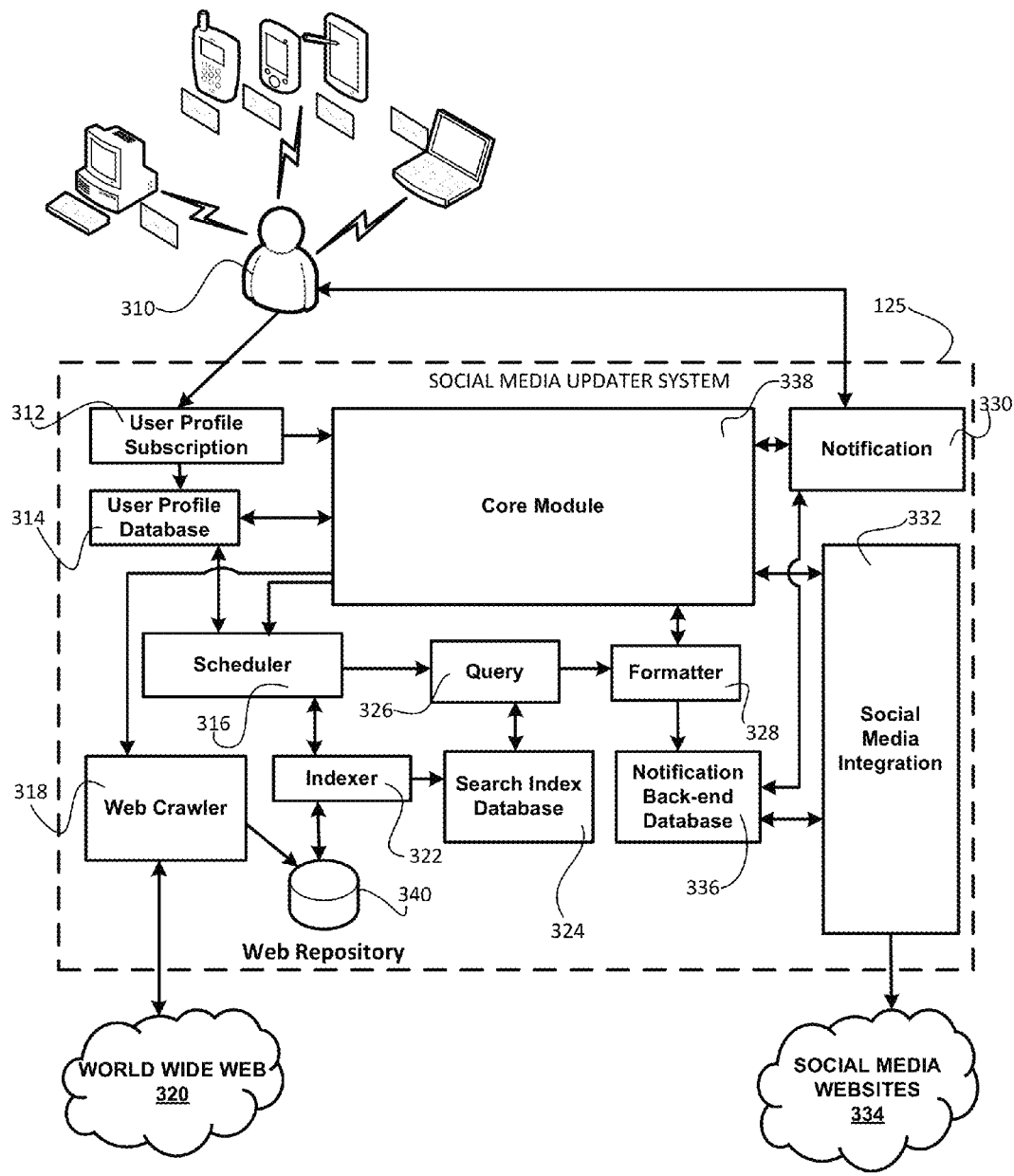
FIG. 3 is an exemplary functional block diagram of the present invention of FIG. 1 according to an implementation consistent with the principles of the invention.

FIG. 3 is an exemplary functional block diagram for the present invention (hereby known as "Social Media Updater System") 125 according to an implementation consistent with the principles of the invention. Social Media Updater system 125 includes Core Module 338, User Profile Subscription component 312, User Profile Database 314, Web Crawler component 318, World Wide Web 320, Web Repository 340, Scheduler component 316, Indexer component 322, Query component 326, Search Index Database 324, Formatter component 328, Notification component 330, Notification Back-End Database 336, Social Media Integration component 332 and Social Media Websites 334.

The Core Module 338 is the backbone of the Social Media Updater System 125 and provides instructions to other components on when to execute. The Core Module 338 provides URLs to the Web Crawler component 318 to crawl the World Wide Web 320. The Web Crawler crawls and stores web pages in the Web Repository 340. The Core Module 338 contains a collection of XSLT template rules instructions and other directives that guide the Formatter component 328 in formatting web pages and creating notification messages.

The User Profile subscription component 312 gathers personal information from user 310 such as full name, location, sex, date of birth, work and education history along with personal interests that the user 310 wants to be queried and collected from the World Wide Web. The User Profile subscription component also collects social media network connection details, which include the social media website name, login username and login password. The user-preferred method to receive notifications is also collected from the user. This information is stored in the User Profile Database 314. Each user 310 in User Profile Database 314 is assigned a user identifier. Each user identifier is unique value across the Social Media Updater System 125.

The Scheduler component 316 runs periodically and triggers the Indexer component 332 to read the repository, and parse the stored web pages. Each web page is converted into a set of repeatedly occurring words called hits. The hits along with the web pages are indexed into the Search Index Database 324. The Scheduler component 316 retrieves the user profile information for all users from User Profile database 314 converts them to keywords based on user activities and feeds it to the Query component 326.

The Query component 326 searches against the Search Index Database 324 for each user profile keywords and construct an XML with all crawled information found for the user and along with the user identifier for the user 310.

The Formatter component 328 applies the XSLT templates from the Core Module 338 and formats the XML with the crawled information to create notification messages. The notification messages for the user are stored in the Notification back-end Database 336 using the user identifier. The user identifier is the same identifier provided in the User Profile Database 314 for the user 310. Each notification message is a short summary of crawled and matched web page and represents the user 310 activities and their interest related information found in the World Wide Web. Each notification message for the user 310 is assigned a unique message identifier and is stored in the database in an Un-Approved status. Each message identifier is unique value across the Social Media Updater System 125.

The Notification component 330 retrieves the notification messages along with the user identifier and the message identifier from the Notification Back-End Database 336 and sends the new notifications to the user 310 depending on their preferred notification method. The Notification component 330 leverages Core Module 338 and retrieves the preferred notification method from the User Profile Database 314 using the user identifier in the Notification Back-End Database 336. The approved notification messages along with the user identifier and the message identifier are received by the Notification component 330. If the message content is changed by the user 310 during review the changed message is updated in the database along with the approval status. The approved messages are updated in the Notification Back-end Database 336 with Approved status using user identifier and message identifier. The rejected messages are updated in the Notification Back-end Database 336 with Rejected status using user identifier and message identifier.

The Social Media Integration component 332 retrieves the Approved notification messages from the Notification Back-End Database 336 and uploads the notification messages to each user's preferred social media websites 334. The Social Media Integration component 332 leverages Core Module 338 and retrieves the preferred social media websites 334 along with login credential information from the User Profile Database 314 using the user identifier in the Notification Back-End Database 336.

Figure 4:
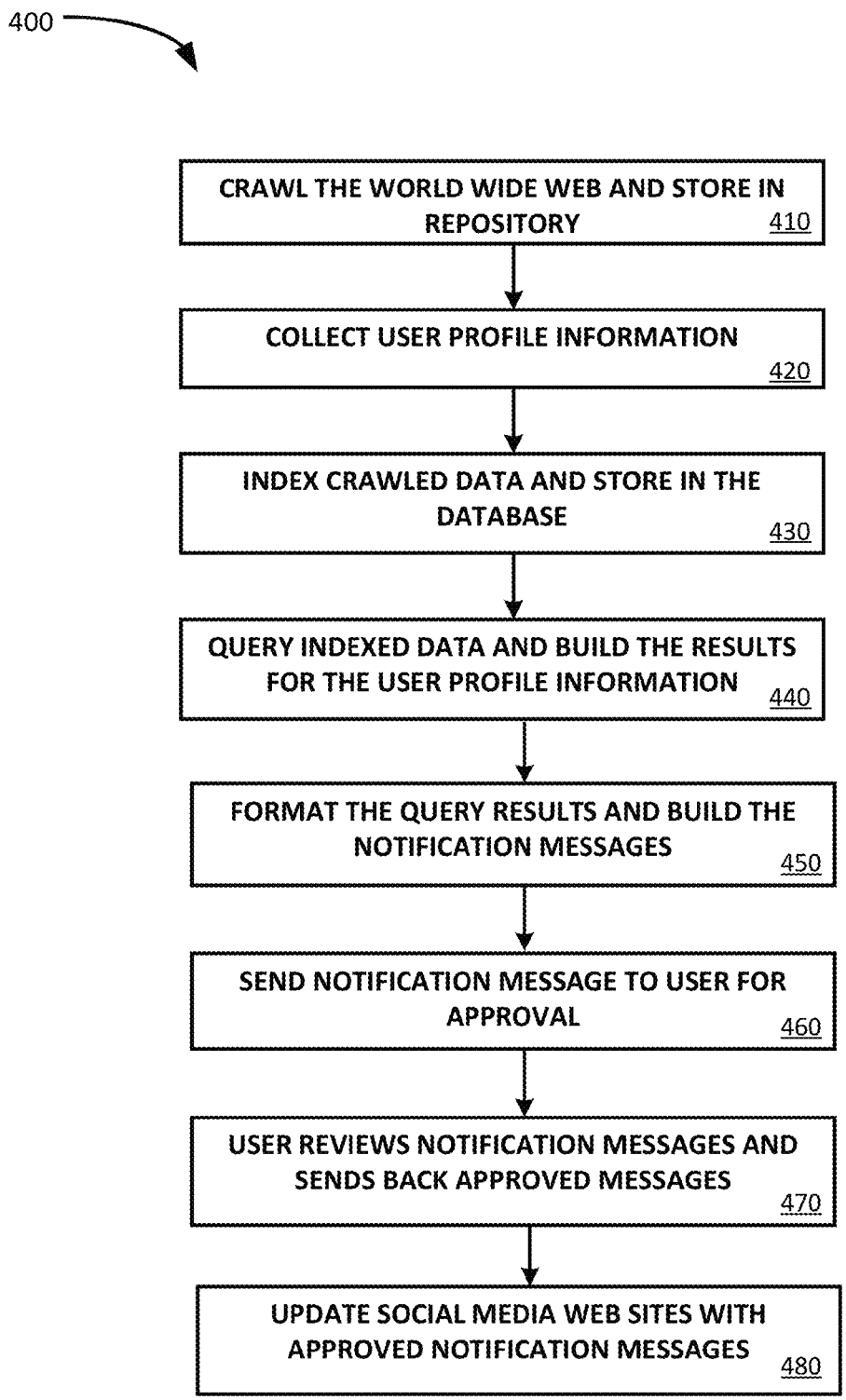
FIG. 4 is a flowchart of exemplary processing for updating user activities to the user preferred social media based on user approval according to an implementation consistent with the principles of the invention.

FIG. 4 illustrates the operation of the present invention. In Act 410, the Core Module 338 provides URLs to the Web Crawler component 318 to crawl the World Wide Web 320. The Web Crawler crawls and stores web pages in the Web Repository 340.

In Act 420, the User Profile subscription component 312 gathers personal information from user 310 such as full name, location, sex, date of birth, work and education history along with personal interests that the user 310 wants to be queried and collected from the World Wide Web. The user 310 fills in as many information as user prefers. The information provided here mainly helps to uniquely identify the user 310 in the World Wide Web 320. The social media websites 334 connection details, which include the social media website name, login username and login password are also collected to help in publishing notification messages to the social media websites 334. The user-preferred method to receive notification message is also collected from the user 310. The preferred method of notification can be through Text messaging (SMS), Voice (telephone, cellphone) E-mail. The User Profile subscription component 312 stores the collected user 310 profile information in the User Profile Database 314.

The Core Module 338 initiates the Scheduler component 316 periodically. The Scheduler component 316 triggers the Indexer component to start parsing the crawled information in the Web Repository 340 and index them by determining the hits in each web page. The Indexer component 322 indexes the crawled content available in the Web Repository 340 and stores in the Search Index Database 324 as described in Act 430. After indexing is complete the Scheduler is notified to start with querying process.

After indexing is complete the Scheduler component 316 retrieves the user profile information along with user identifier from the User Profile Database 314 and builds keywords using the user activities. These keywords are fed to the Query component 326 to retrieve indexed information for each user. The Query component 326 constructs the results as an XML with the user identifier and indexed context containing the recent activities of the user found in the World Wide Web 320 as described in Act 440. The constructed XML is fed to the Formatter component 328.

In Act 450, the Formatter component 328 uses the XSLT templates from the Core Module 338 and formats the XML results as notification messages. There can be one or more XSLT templates that can used to produce a notification message. The notification messages can be of any format, it can be other XML documents or other objects such as HTML for web pages, plain text or XSL Formatting Objects, which can then be converted to PDF, PostScript and PNG. Each notification message contains the user identifier and a message identifier for proper tracking of notification messages. The notification messages for each user along with user identifier and a message identifier are stored in the Notification back-end Database 336 in an Un-approved status. The Formatter component 328 indicates to the Core Module 338 that new updates are available for users.

The Core Module 338 then initiates the Notification component 330. In Act 460, the Notification component 330 retrieves the new notifications from the Notification Back-End Database 336 and sends the new notifications in Un-Approved status to the user 310 using their preferred notification method. The user identifier and message identifier retrieved from the Notification Back-End Database 336 is also sent to the user 310. The preferred notification method is obtained from the User Profile Database 314 using the user identifier in the Notification Back-End Database 336 using Core Module 338.

In Act 470, the user 310 reviews the notification messages received and approves or rejects the notification messages. The user 310 can also edit the textual content of the notification message and sends back the approved notifications messages along with the user identifier and message identifier. The approved notifications are received by the Notification component 330 and it updates the messages in the Notification Back-end Database 336 with an Approved status using the user identifier and message identifier received. If the user 310 changes the message the new message content is updated in the Notification Back-end Database 336 using the user identifier and message identifier. The Core Module 338 is informed that the approvals have been received for the user 310.

In Act 480, the Core Module 338 initiates the Social Media Integration component 332 that retrieves the Approved notification messages from the Notification Back-End Database 336 and uploads the notification messages to each of the user 310 preferred social media websites 334. The website details along with login credentials information are retrieved from the User Profile Database 314 using the user identifier in the Notification Back-End Database 336 using Core Module 338.

EXAMPLE

A user called "Robert Miller" has filed a patent application and it got published over the World Wide Web. Even though he would like to share this information to his friends through his social media websites, he could not find time and opportunity to share this information to his friends and family. So, Robert Miller subscribes his personal information like his name Robert Miller, location Greenville S.C., sex as Male along his education and work history. He also provides his interests like Patent Writing, Fishing, and Football with the present invention. He subscribes the social networking sites along with login credentials for each of his preferred social networking sites such as Facebook.com, Twitter.com, Tumblr.com, myspace.com, googleplus.com. He also indicates that his preferred notification method is email and provides the email address that needs to be used to receive the notification messages.

The present invention periodically crawls the World Wide Web finds the Patent published webpage and downloads it to a repository along with other web pages. A scheduled process indexes the crawled content using the hits in the crawled web page. The scheduled process creates keywords for user Robert Miller like "Robert+Miller+Greenville+SouthCarolina+Male+Patents+Fishining+Football" and queries using the keyword to find a match with indexes. Once the different matches are found using the keywords the crawled web pages are formatted to different notification messages for Robert Miller.

The present invention sends all the notification messages to his email address. Robert Miller approves or rejects the individual notification messages. Robert Miller edits and modifies the textual content of one of the received notification message and sends it to the present invention along with other approved notification messages. He also approves the notification message that indicates his patent publication message. The present invention receives his approved notifications such as his patent publication message along with other approved messages. The present invention saves the changed message to the database. The present invention updates all the approved messages to his social media websites such as Facebook.com, Twitter.com, Tumblr.com, myspace.com, googleplus.com by using his credentials details.

CONCLUSION

Implementations consistent with the principles of the invention may leverage user subscribed information to search for latest user activities in the World Wide Web. Information found about the user and user interests are sent to user for review. After user approves messages the messages are posted to user preferred social media websites.

The foregoing description of implementations consistent with the principles of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIG. 4, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method to update user activities from the World Wide Web to subscribed social media web sites after approval, the method comprising:

generating a plurality of content for the plurality of user about the plurality of user activities that are available in the World Wide Web to update them to a plurality of user subscribed social media web sites by allowing the user to modify the content while approving the notification message;

storing in a database a plurality of user profiles;

crawling the World Wide Web for plurality of web pages and storing crawled web pages in a database;

indexing a plurality of crawled web pages and storing them in a database;

querying for plurality of information about one or more users available in the user profile database from the database said in indexing step;

generating a plurality of notification messages for plurality of users available in the user profile database;

storing a plurality of notification messages for users in notification database;

sending plurality of notification messages to a plurality of users using users preferred notification method;

receiving approved notification messages from the plurality of users;

updating a plurality of modified notification messages from plurality of users in notification database;

retrieving a plurality of approved notification messages from notification database and a plurality of social media websites along with credentials for the plurality of users from user profile database;

updating the plurality of approved notification messages of users to their corresponding subscribed social media websites.

2. The method of claim 1, wherein a user profile comprises of information about the user and user interests to uniquely identify the user activities in World Wide Web, subscribed social media websites along with login credentials, preferred notification method to receive notification messages.

3. The method of claim 1, wherein generating a notification message is a formatted content about the user or user related activities available in World Wide Web.

4. The method of claim 1, wherein sending notification message refers to obtaining a user approval for the user activities and user interest related information found in the World Wide Web prior to updating to the user subscribed social media websites.

5. The method of claim 1, wherein a modified notification message is a modified content by the user while reviewing the notification message before approving the notification message.

6. The method of claim 1, wherein a user activity is a description of an action taken by the user or description of user interests that is available in the World Wide Web.

7. A computer system comprising:
   one or more processors; and
   a memory coupled to the processors comprising instructions executable by the processors, the processors operable when executing the instructions to:

generate a plurality of content for the plurality of user about the plurality of user activities that are available in the World Wide Web to update them to a plurality of user subscribed social media web sites by allowing the user to modify the content while approving the notification message;

store a plurality of user profile information in a database in association with user identification;

retrieve a plurality of user activities for the plurality of users available in the user profile database by crawling, indexing the World Wide Web and querying the indexed information;

generate a plurality of notification messages for the plurality of user activities retrieved from the World Wide Web;

store a plurality of notification messages in notification database in association with user identification and message identification;

send a generated plurality of notification messages to the plurality of users using their desired notification method;

receive a plurality of user approvals for the plurality of notification messages and update the received plurality of notification messages in the notification database in association with user identification and message identification;

retrieve a plurality of user approved notification messages from the notification database and update to user subscribed plurality of social media web sites.

8. A non-transitory computer readable medium having embodied thereon a program, the program being executable by a processor for performing a method to update user activities from the World Wide Web to subscribed social media web sites after approval, the method comprising:

generating a plurality of content for the plurality of user about the plurality of user activities that are available in the World Wide Web to update them to a plurality of user subscribed social media web sites by allowing the user to modify the content while approving the notification message;

storing in a database a plurality of user profiles;

crawling the World Wide Web for plurality of web pages and storing crawled web pages in a database;

indexing a plurality of crawled web pages and storing them in a database;

querying for plurality of information about one or more users available in the user profile database from the database said in indexing step;

generating a plurality of notification messages for plurality of users available in the user profile database;

storing a plurality of notification messages for users in notification database;

sending plurality of notification messages to a plurality of users using users preferred notification method;

receiving approved notification messages from the plurality of users;

updating a plurality of modified notification messages from plurality of users in notification database;

retrieving a plurality of approved notification messages from notification database and a plurality of social media websites along with credentials for the plurality of users from user profile database;

updating the plurality of approved notification messages of users to their corresponding subscribed social media websites.

9. The non-transitory computer readable medium according to claim 8, wherein a user profile comprises of information about the user and user interests to uniquely identify the user activities in World Wide Web, subscribed social media websites along with login credentials, preferred notification method to receive notification messages.

10. The non-transitory computer readable medium according to claim 8, wherein generating a notification message is a formatted content about the user or user related activities available in World Wide Web.

11. The non-transitory computer readable medium according to claim 8, wherein sending notification message refers to obtaining a user approval for the user activities and user interest related information found in the World Wide Web prior to updating to the user subscribed social media websites.

12. The non-transitory computer readable medium according to claim 8, wherein a modified notification message is a modified content by the user while reviewing the notification message before approving the notification message.

13. The non-transitory computer readable medium according to claim 8, wherein a user activity is a description of an action taken by the user or description of user interests that is available in the World Wide Web.

* * * * *